United States Patent
Dos Santos Vieira Lima et al.

(10) Patent No.: US 11,644,155 B2
(45) Date of Patent: May 9, 2023

(54) AUXILIARY SYSTEM AND METHOD FOR STARTING OR RESTARTING THE FLOW OF GELLED FLUID

(71) Applicants: PETRÓLEO BRASILEIRO S.A.—PETROBRAS, Rio de Janeiro (BR); UNIVERSIDADE TECNOLOGICA FEDERAL DO PARANA, Curitiba (BR)

(72) Inventors: Guilherme Dos Santos Vieira Lima, Maceió (BR); Cezar Otaviano Ribeiro Negrao, Curitiba (BR); Eduardo Martinez Barreira, Curitiba (BR); Nezia De Rosso, Curitiba (BR); Paulo Henrique De Carvalho, Curitiba (BR); Fernando Machado Kroetz, Curitiba (BR)

(73) Assignees: PETRÓLEO BRASILEIRO S.A,—PETROBRAS, Rio de Janeiro (BR); UNIVERSIDADE TECNOLOGICA FEDERAL DO PARANA, Curitiba (BR)

( * ) Notice: Subject to any disclaimer, the term of this patent is extended or adjusted under 35 U.S.C. 154(b) by 0 days.

(21) Appl. No.: 16/326,022

(22) PCT Filed: Jan. 25, 2018

(86) PCT No.: PCT/GB2018/050211
§ 371 (c)(1),
(2) Date: Feb. 15, 2019

(87) PCT Pub. No.: WO2019/145664
PCT Pub. Date: Aug. 1, 2019

(65) Prior Publication Data
US 2021/0356080 A1    Nov. 18, 2021

(51) Int. Cl.
*F15B 1/24* (2006.01)
*F17D 1/20* (2006.01)
(Continued)

(52) U.S. Cl.
CPC .................. *F17D 1/20* (2013.01); *F15B 1/24* (2013.01); *F16L 55/053* (2013.01); *F17D 1/08* (2013.01)

(58) Field of Classification Search
CPC ....... F16L 55/053; F16L 55/052; F15B 1/021; F15B 1/24; F15B 2201/413;
(Continued)

(56) References Cited

U.S. PATENT DOCUMENTS

| | | | |
|---|---|---|---|
| 2,958,333 A | 11/1960 | Poettmann et al. | |
| 3,048,479 A | 8/1962 | Ilnyckyj et al. | |

(Continued)

FOREIGN PATENT DOCUMENTS

| | | |
|---|---|---|
| DE | 1 224 562 B | 9/1966 |
| EP | 0 113 581 A1 | 7/1984 |

(Continued)

OTHER PUBLICATIONS

International Search Report for PCT/GB2018/050211 dated Sep. 18, 2018 [PCT/ISA/210].
(Continued)

*Primary Examiner* — Patrick F Brinson
(74) *Attorney, Agent, or Firm* — Sughrue Mion, PLLC

(57) ABSTRACT

The present invention relates to an auxiliary system for starting or restarting the flow of gelled fluid contained in a pipeline (12) wherein the system comprises: at least one relief tank (13) fluidly connected (11) to the pipeline (12), wherein at least one relief tank (13) is suitable for receiving fluid from the pipeline (12); and at least one pressurising element upstream of at least one tank, suitable for pressuris- (Continued)

ing the fluid in the pipeline (12), Additionally, the invention also provides an auxiliary method for starting or restarting the flow of gelled fluid in a pipeline (12) comprising at least one tank fluidly connected (11) to the pipeline (12) and at least one pressurising element upstream of at least one tank, wherein the method comprises the step of, at the start of the process, the pressurising element increasing the pressure in the pipeline (12) and filling at least one tank at least partially with fluid coming from the pipeline (12).

13 Claims, 5 Drawing Sheets

(51) Int. Cl.
*F16L 55/053* (2006.01)
*F17D 1/08* (2006.01)

(58) Field of Classification Search
CPC ........ F15B 2201/205; F15B 2201/3151; F15B 2201/31; F15B 2201/312
USPC ................................ 138/26, 30, 31; 137/207
See application file for complete search history.

(56) References Cited

U.S. PATENT DOCUMENTS

| | | | | |
|---|---|---|---|---|
| 3,672,398 A * | 6/1972 | Ichiryu | ............... | F04B 11/0016 137/565.34 |
| 3,780,750 A | 12/1973 | Perkins et al. | | |
| 3,780,751 A | 12/1973 | Styring, Jr. | | |
| 3,791,395 A | 12/1974 | Dunlap et al. | | |
| 3,857,413 A * | 12/1974 | Zahid | ....................... | F15B 1/22 138/26 |
| 3,961,916 A | 6/1976 | Ilnyckyj et al. | | |
| 4,104,171 A | 8/1978 | Stechmeyer | | |
| 4,298,030 A * | 11/1981 | Mercier | ................... | F15B 1/22 138/30 |
| 4,745,937 A | 5/1988 | Zagustin et al. | | |
| 5,219,000 A * | 6/1993 | Chalasani | ................ | F15B 1/22 138/26 |
| 5,263,360 A * | 11/1993 | Blauch | .................... | C09K 8/94 73/38 |
| 5,636,513 A * | 6/1997 | Pahl | ......................... | F02K 9/50 60/204 |
| 5,797,430 A * | 8/1998 | Becke | ................. | F04B 11/0016 138/26 |
| 5,971,027 A * | 10/1999 | Beachley | ................. | F15B 3/00 138/30 |
| 6,076,557 A * | 6/2000 | Carney | ................... | F15B 1/103 138/30 |
| 6,089,837 A * | 7/2000 | Cornell | ................... | F04B 11/00 138/26 |
| 6,110,238 A | 8/2000 | Krull et al. | | |
| 8,434,524 B2 * | 5/2013 | Barth | ....................... | F15B 1/04 138/30 |
| 2009/0205731 A1 * | 8/2009 | Weber | ...................... | F15B 1/22 138/31 |
| 2012/0211112 A1 * | 8/2012 | Barth | ................. | F16H 61/4096 138/30 |
| 2016/0369598 A1 * | 12/2016 | Smedstad | ........... | E21B 41/0007 |

FOREIGN PATENT DOCUMENTS

| | | |
|---|---|---|
| FR | 1 107 500 A | 1/1956 |
| GB | 1 263 152 A | 2/1972 |
| WO | 2017/150819 A1 | 9/2017 |

OTHER PUBLICATIONS

Written Opinion for PCT/GB2018/050211 dated Sep. 18, 2018 [PCT/ISA/237].

\* cited by examiner

AUXILIARY SYSTEM AND METHOD FOR STARTING OR RESTARTING THE FLOW OF GELLED FLUID

CROSS REFERENCE TO RELATED APPLICATIONS

This application is a National Stage of International Application No. PCT/GB2018/050211, filed on Jan. 25, 2018.

FIELD OF THE INVENTION

The present invention relates to a system and method for starting or restarting the flow of gelled fluids.

BACKGROUND TO THE INVENTION

Certain fluids gel when subjected to temperatures near or below the pour point. The lower the temperature, the more solid the gel formed will be. The gelation process reduces or completely removes the fluidity of these fluids, mainly after they are subjected to a long resting period. Particularly for petroleum and paraffin fuel oils, the gelation process occurs owing to the formation of paraffin crystals in the fluid.

This problem of gelation is often faced in pipelines used for fluid flow, such as petroleum production lines. In these cases, especially in situations where it is necessary to interrupt the production process owing to maintenance operations or any type of emergency operation, the fuel oil present in the pipelines may gel inside the pipeline.

The gelation process is more intense in production pipelines installed for submarine wells. This is because the low ambient temperature results in the gel formed having an even more rigid consistency.

In order for gelled fluids to start to flow again, the gel structure must be degraded/fractured by means of shearing, as known in the prior art. In these processes, the flowing fluid is pressurised at at least one point. This is so that the flow pressure is increased to the point of overcoming the resistance of the gel formed, until the flowing fluid regains its characteristic fluidity. Then the pressure can be reduced.

Therefore, as the gelled structure is degraded, the viscosity of the fluid continues to decrease. For this reason, when the flow is being started in a pipe, or the flow is being restarted after a break in production, the viscosity of the fluid remains high until the gel degradation process is completely finished.

Therefore, due to the high viscosity of the gelled fluid, the initial period of flow displays pressure peaks along the pipe, at the points of pressurisation. These pressures are higher than the usual pressures used in the permanent system, and the highest pressure can be found at the end where the fluid is pressurised. This additional pressurisation can cause accidents such as breakage of the pipelines.

The process of starting or restarting the flow of gelled fluids generally involves the use of a conventional hydraulic pump in a pipe with a cylindrical cross-section.

The fluid pressurised by the pump undergoes shearing on the walls of the pipes, which results in the gradual degradation of the gel along the whole length of the pipe. During submarine oil exploration, flow may need to be started/ restarted both for the extraction of paraffin oil from the well to the exploration platform, and from the exploration platform to the coast; and this route can extend for hundreds of kilometres. Therefore, owing to the low temperatures of the sea bed and the lengths of the pipes, the pressures required to degrade the gel can be very high.

The high pressures required may exceed the design pump pressures or safe operating pressures of the related pipes and equipment.

Various ways of solving the issue of gelation have been proposed, including the use of additives in the fuel composition which reduce the viscosity of the fluid in the pipeline. U.S. Pat. No. 3,048,479, for example, explores the use of ethylene copolymers and C3-C5 vinyl esters as additives that reduce the pour point of fuels. Similarly, patent U.S. Pat. No. 3,961,916 addresses the use of a mixture of dual-action copolymers, which prevent the growth of paraffin crystals.

Patent GB 1,263,152 suggests that the size of paraffin crystals can be controlled by a copolymer with a lower degree of side chain branching.

Patent EP 0,113,581 A1, in turn, proposes a specific composition of additives of ethylene copolymers and vinyl esters for petroleum-derived fuels with specific ranges for distillation and boiling point; and U.S. Pat. No. 6,110,238, finally, proposes the use of copolymer additives to improve fluidity at low temperatures of fuel oils with a narrow distillation range and high boiling limit.

Physical processes for transporting gelled fluids have also been the subject of several patents.

U.S. Pat. No. 2,958,333 A explores, among other methods, the use of turbulence to prevent the accumulation and stagnation of fluid in pipes. The patent proposes injecting a pressurised fluid into the pipe to maintain a high level of turbulence.

In order to solve the same problem, patent U.S. Pat. No. 4,745,937 A explores the use of an initial flow of a fluid with low viscosity, such as water, in order to increase the flow of the oil that was previously resting until a flow is obtained in steady state, so that only then is the oil re-introduced into the pipe and the flow is restarted.

Document U.S. Pat. No. 3,780,751 A discloses a method for restarting a portion of pipe blocked by a gelled fluid, wherein lower pressure than normal is applied. According to the method from U.S. Pat. No. 3,780,751 A, the portion of tube includes spaced-apart points for the injection of fluid, where fluids are injected under controlled pressure. The injected fluid "breaks" the portions of gelled fluid into segments, so that the pressure required to degrade the gel is reduced.

Document U.S. Pat. No. 4,104,171 A discloses a process for reducing the force required to restart a flow chilled up to its gelation point. The process from U.S. Pat. No. 4,104,171 A involves the insertion of a plurality of spacer fluids into a petroleum tower, dividing said tower into hydraulically insulated segments, which reduces the amount of energy required to start the pipe again.

Document U.S. Pat. No. 3,780,750 A discloses a method for facilitating the renewal of a flow of gelled petroleum, wherein a segment of gelled fluid is removed from the pipe, which causes liquid petroleum to flow through the pipe that was previously occupied by gelled liquid. Then, the gelled fluid is returned to the pipe.

Document U.S. Pat. No. 3,791,395 A discloses a method for resuming the flow in a pipe blocked by a gelled fluid wherein pulses or cycles of pressure are applied to the gelled liquid, so that the liquid is progressively degraded. After the degradation of the gelled fluid, the flow pressure exerted by the pump can be returned to normal.

Therefore, all methods and systems for resuming flow in pipes disclosed in the prior art generate a high pressure peak at the time flow is restarted, or involve the use of additives in the fuel composition in order to reduce its viscosity. As previously mentioned, the first option may increase the risk of accidents in pipes, while the second option requires ongoing financial resources.

SUMMARY OF THE INVENTION

The main aim of the present invention is to provide a system and method for restarting flow in pipes, which allows the gelled fluid to be degraded without causing high pressure peaks at points of the pipe and without using chemical additives in the fluid.

Therefore, in order to meet this aim, the present disclosure provides a system for starting or restarting the flow of gelled fluid, the system comprising one or more of: a pipeline; a relief tank fluidly connected to the pipeline, wherein the relief tank is suitable for receiving fluid from the pipeline; and a pressurising element upstream of the relief tank, suitable for pressurising the fluid in the pipeline.

Also provided is a method for starting or restarting the flow of gelled fluid in a pipeline having a relief tank fluidly connected to the pipeline and having a pressurising element upstream of the relief tank, wherein the method comprises one or more of the steps of: the pressurising element increasing the pressure in the pipeline; and at least partially filling the relief tank with fluid from the pipeline.

Also provided is a relief tank for use in a system for starting or restarting the flow of gelled fluid in a pipeline, the relief tank being fluidly connectable to the pipeline, and suitable for receiving fluid from the pipeline.

Also provided is an auxiliary system for starting or restarting the flow of gelled fluid contained in a pipeline comprising: at least one relief tank fluidly connected to the pipeline, wherein at least one relief tank is suitable for receiving fluid from the pipeline; and at least one pressurising element upstream of at least one tank, suitable for pressurising the fluid in the pipeline. Additionally, the invention also provides an auxiliary method for starting or restarting the flow of gelled fluid in a pipeline comprising at least one tank fluidly connected to the pipeline and at least one pressurising element upstream of at least one tank, wherein the method comprises the step of, at the start of the process, the pressurising element increasing the pressure in the pipeline and filling at least one tank at least partially with fluid coming from the pipeline.

The disclosure provides an auxiliary system for starting or restarting the flow of gelled fluid comprising a pipeline characterised in that it comprises one or more of: at least one relief tank fluidly connected to the pipeline, wherein at least one relief tank is suitable for receiving fluid from the pipeline; and at least one pressurising element upstream of at least one tank, suitable for pressurising the fluid in the pipeline.

In some embodiments at least one relief tank comprises a means for expelling fluid contained in at least one relief tank towards the pipeline.

In some embodiments at least one relief tank comprises a means for carrying energy suitable for: carrying energy when the tank is filled with the fluid coming from pipeline and expelling the fluid contained inside it into the pipeline using the energy carried.

In some embodiments the relief tank comprises a free piston which comprises a separator element separating the relief tank into: a chamber for receiving gelled fluid in the pipeline; and a chamber comprising a means for carrying energy.

In some embodiments the means for carrying energy is: a gas, a fluid, elastic element, a helical spring, and a foam.

In some embodiments the means for carrying energy has the capacity to automatically release the energy carried.

In some embodiments the system comprises a number of relief tanks distributed along the pipeline.

The disclosure also provides a method for starting or restarting the flow of gelled fluid in a pipeline comprising at least one tank fluidly connected to the pipeline and at least one pressurising element upstream of at least one relief tank, characterised in that it comprises one or more of the steps of, at the start of the procedure: the pressurising element increasing the pressure in the pipeline; and filling at least one tank at least partially with fluid coming from the pipeline.

In some embodiments at least one relief tank expels fluid contained in at least one relief tank towards the pipeline when the pressure in the pipeline is reduced.

In some embodiments at least one tank comprises a means for carrying energy, wherein the means for carrying energy performs the steps of: carrying energy when the tank is filled with the fluid coming from pipeline and expelling the fluid contained inside it into the pipeline using the energy carried when the pressure in the pipeline is reduced.

In some embodiments the means for carrying energy automatically releases the energy carried when the pressure in the pipeline is reduced.

BRIEF DESCRIPTION OF FIGURES

The detailed description presented below refers to the attached figures and their respective reference numbers, representing the embodiments of the present disclosure.

DETAILED DESCRIPTION OF THE INVENTION

The present disclosure is directed to a system and a method for starting or restarting the flow of a gelled fluid. Although the following description is directed to systems and methods handling fuel oils, especially petroleum, it will be apparent to anyone skilled in the art that it will be possible to apply these teachings to any type of fluid that may undergo the gelation process.

Figure 1:
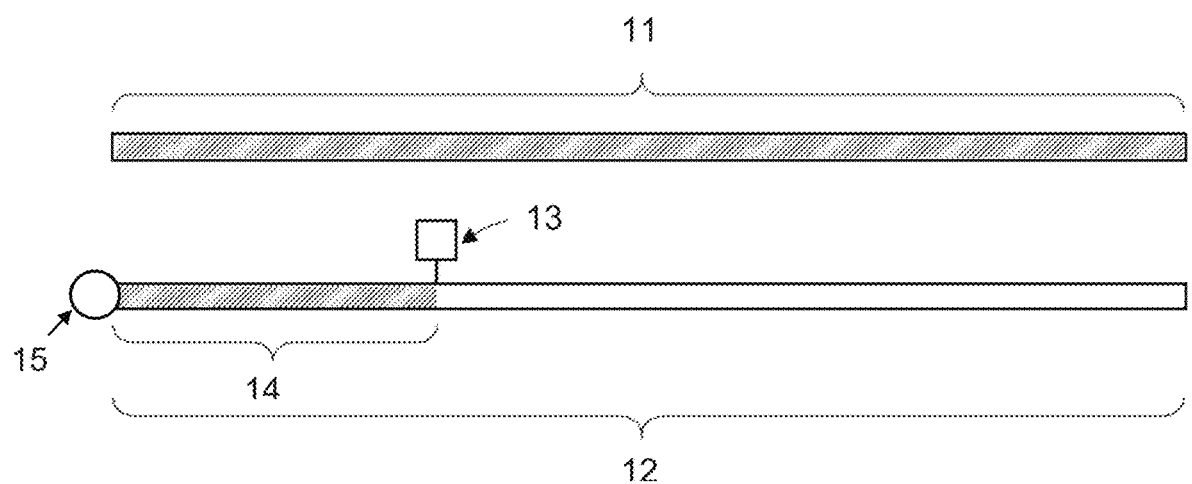
FIG. 1 illustrates an optional embodiment of the system for starting or restarting the flow of gelled fluid of the present disclosure.

FIG. 1 shows a conventional pipeline 11 and an optional embodiment of the present disclosure, wherein a system for starting or restarting the flow of gelled fluid is illustrated. The system includes a pipeline 12, and at least one relief tank 13 fluidly connected to the pipeline 12. At least one pressurising element (15) can be provided upstream of the at least one relief tank 13.

In general, as already described, in order to start or restart the flow of gelled fluid in a pipeline 12, it is necessary that the pressure exerted by the pressurising element (15) be increased. This is because the viscosity of the gelled fluid is greater than the viscosity of the fluid in its liquid form, and so a greater pressure is required for the gelled fluid to flow through the pipeline 12.

With the system of the present disclosure, however, the amount of the pressure increase is decreased. This is because the gelled fluid 14 tends to be drained into the relief tank 13 fluidly connected to the pipeline 12. This is due to the fact that the relief tank 13 is initially empty. Therefore the gelled fluid 14 encounters less resistance in order to flow into the relief tank 13 than it would encounter in order to flow through the pipeline 12 filled with gelled fluid.

Additionally, the greater the length of the stretch of the pipeline filled with gelled fluid 14, the greater the pressure required for said fluid to flow. By using at least one relief tank 13, the amount of total gelled fluid 14 in the pipeline 12 is reduced, also reducing the length of the stretch of duct filled with gelled fluid 14. In this way, the pressure increase required for the gelled fluid to flow is reduced compared with the systems from the prior art (without the use of a relief tank 13).

Returning to FIG. 1, taking into account that the pipe is designed so that fluid flows from left to right, a pressurising element (15) is preferably positioned upstream of at least one relief tank 13. Therefore, upon starting or restarting a flow when the pipe 12 is filled with gelled fluid, part of the fluid contained in the stretch of pipeline downstream of the pressurising element (15) and upstream of at least one relief tank 13 (hatched section 14) will flow towards the relief tank 13 during the initial stage of the flow. As previously mentioned, this is owing to the lower hydraulic resistance that the gelled fluid, upstream of the tank, encounters as it flows into the tank compared with the resistance required to move all of the fluid ahead of it in the pipe, wherein part or all of said fluid may still be gelled.

Therefore, taking into account the movement of the gelled fluid into the relief tank 13, the volume of fluid of segment 14 is the only volume that is initially moved, which is less than the total volume of fluid that will flow through the entire pipe. This being the case, the fluid upstream of the tank 13 can be initially degraded without affecting the rest of the fluid in the pipe 12. Therefore, the pressure required to degrade this amount of gelled fluid is lower than the pressure required to fracture all of the gelled fluid in the pipe 12.

Once the initial quantity of gel 14 is degraded, the pressure applied to the left end of pipe 12 in FIG. 1 is then transmitted to the fluid downstream of the tank, which may then also be de-structured.

This degradation of the gelled structure in stages reduces the pressure required to start the flow, compared with the case where the gelled structure is degraded all at once.

Once the gel degradation is complete, and the pressure reduces, the fluid moved into the relief tanks 13 can be moved back into the pipeline 12, as discussed in further detail below. This allows the system to be reset; and used again.

In alternative configurations, a number of spaced-apart relief tanks 13 may be used, so that a longer stretch of the pipeline 12 is covered. For a given length of pipeline 12, the pressure required when the flow is restarted should decrease as the number of tanks distributed along the pipe increases.

It should be noted that a number of configurations are contemplated wherein a plurality of tanks may be used, as well as more than one pressurising element. That is, a pressurising element (15) may serve to overcome gelation in a section of pipeline 12 associated with a single tank 13, with another pressuring element being provided to overcome gelation in a subsequent section of pipeline 12 associated with another tank 13, and so on down the pipeline 12. In other arrangements; each pressuring element may serve to overcome gelation in a section of pipeline 12 associated with two or more tanks 13.

Additionally, the disclosure also provides a method for starting or restarting the flow of gelled fluid in a pipeline 12 comprising at least one tank fluidly connected 11 to the pipeline 12 and at least one pressurising element (15) upstream of at least one tank. The method can comprise the step of, at the start of the process, filling at least one tank at least partially with gelled fluid.

Figure 2:
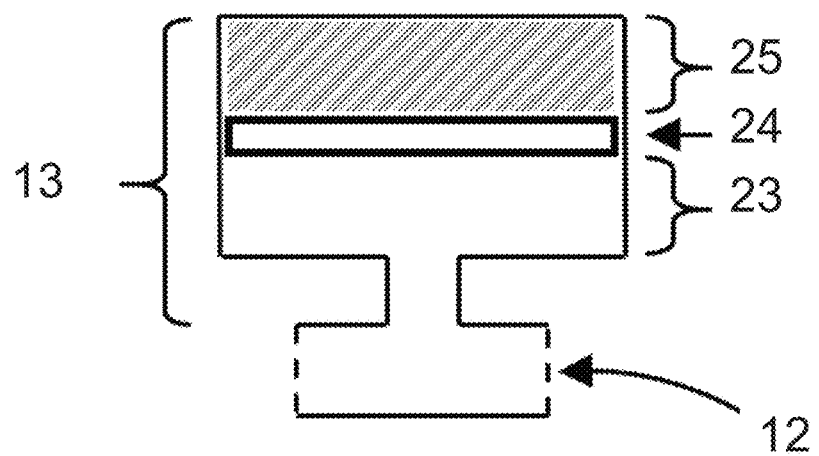
FIG. 2 illustrates an optional configuration of the relief tank for the system of the present disclosure.

FIG. 2 shows an optional configuration of the relief tank 13 for the system from the present disclosure; wherein the tank comprises an energy storage section 25 as a means for carrying/storing energy 25. The energy storage section 25 can be suitable for carrying energy when the tank is filled with fluid from the pipeline 12; and also for expelling the fluid contained inside it into the pipeline 12 using the energy carried.

Specifically in the illustrated configuration, a free piston comprising a separator element 24 is illustrated, separating the relief tank 13 into: a chamber 23 for receiving gelled fluid from the pipeline; and a chamber comprising an energy storage section 25.

Therefore, with the increase of pressure in the pipeline 12 when operations are started or restarted, the gelled fluid is pressed from the pipeline 12 into the tank towards the chamber 23 for receiving gelled fluid. The separator element 24 is moved by this flow of gelled fluid into the tank 13, so as to compress the energy storage section 25 within the chamber comprising the energy storage section 25. The compression causes energy storage section 25 to carry energy (i.e. to store energy), Then, as already set out, at the moment when the flow in the pipeline 12 is stabilised and the pressure in the pipeline 12 is reduced, the energy storage section 25 begins to release energy, pressing the gelled fluid back into the pipeline 12.

In an optional configuration, the energy storage section 25 comprises a gas, wherein the chamber comprising the energy storage section 25 is sealed and filled with a gas, so that the compression of the gas is the method for carrying energy of this energy storage section 25. Therefore, when the pressure of the pipeline 12 increases, the gas in the chamber comprising the energy storage section 25 is compressed, allowing the gelled fluid in the tube 12 to migrate into the chamber 23 receiving the gelled fluid. With the movement of the piston 24, the volume occupied by the gas in the energy storage section 25 decreases while the volume of gelled fluid in the chamber for receiving the gelled fluid 23 increases. Reducing the volume of the energy storage section 25 increases the pressure of the gas therein, in other words, the gas carries energy while it is being compressed.

As the pressure in the pipe decreases, the compressed gas inside the chamber containing the energy storage section 25 presses the separator element 24 so as to expel the gelled fluid back into the pipeline 12.

It should be noted that the energy storage section 25 can be any means or device for carrying or storing energy 25, such as an elastic element, a spring (helical or otherwise), various other gas fluids, gas-filled foams, or any known energy carrier element.

Preferably, the energy storage section 25 also has the ability to automatically release the energy carried, as happens with a gas, which releases the energy carried by means of its expansion, like a spring, which releases the energy carried by retracting/expanding, among others.

In alternative configurations, a mechanical or electrical system may be used to expel the gelled fluid from the chamber when the flow in the pipeline 12 has returned to normal. In such cases, a piston, for example, may be positioned in the relief tank 13, so that when the relief tank 13 is filled and the flow resumes/starts in the pipeline 12, the piston is actuated (either manually or automatically) in order to press the gelled fluid back into the pipeline 12.

Note that the volume of the relief tank 13 for receiving gelled fluid in pipeline 12 will vary depending on each application, i.e., it varies depending on the volume of gelled fluid that needs to be degraded, the number of relief tanks used, the maximum permitted pressure in the pipe, etc.

It should be stressed that the present disclosure contemplates the use of one or more pressure relief tanks including a plurality of said tanks, distributed at equal or varying distances throughout the pipe through which the gelled fluid will flow. The tanks optionally both receive and return fluid to the pipe during its operation. The tanks may also have the same or different maximum capacities. The disclosed method may be employed to start the first operation involving transporting gelled fluid, or after any break in production, wherein gelled fluid is formed in the pipeline 12.

It is also important to note that the solution proposed by the present disclosure may be used in conjunction with other solutions known in the prior art, if desired.

Therefore, to summarise, the present disclosure provides an auxiliary system for starting or restarting the flow of gelled fluid comprising a pipeline 12 wherein the system comprises: at least one relief tank 13 fluidly connected to the pipeline 12, wherein at least one relief tank 13 is suitable for receiving fluid from the pipeline 12; and at least one pressurising element (15) upstream of at least one tank, suitable for pressurising the fluid in the pipeline 12.

Optionally, at least one relief tank 13 comprises a mechanism for expelling fluid contained in at least one relief tank 13 towards the pipeline 12.

Optionally, at least one relief tank 13 comprises a energy storage section 25 suitable for: carrying energy when the tank is filled with fluid coming from the pipeline 12; and expelling into the pipeline 12 the fluid contained therein using the energy carried.

Optionally, the relief tank 13 comprises a free piston, which comprises a separator element 24 separating the relief tank 13 into: a chamber for receiving gelled fluid 23 in the pipeline 12; and a chamber comprising a energy storage section 25.

Optionally, the energy storage section 25 comprises; a gas, a fluid, a spring, and a foam.

Optionally, the energy storage section has the ability to automatically release the energy carried.

Optionally, the system comprises a plurality of relief tanks.

Additionally, the disclosure also provides an auxiliary method for starting or restarting the flow of gelled fluid in a pipeline 12 comprising at least one tank fluidly connected 11 to the pipeline 12 and at least one pressurising element (15) upstream of at least one tank, wherein the method comprises the step of, at the start of the process, the pressurising element (15) increasing the pressure in the pipeline 12 and filling at least one tank at least partially with fluid coming from the pipeline 12.

Optionally, at least one tank expels fluid contained in at least one relief tank 13 towards the pipeline 12 when the pressure in the pipeline 12 is reduced.

Optionally, at least one tank comprises a energy storage section 25, wherein the energy storage section 25 performs the steps of: carrying energy when the tank is filled with the fluid coming from the pipeline 12; and expelling the fluid contained inside it into the pipeline 12 using the energy carried when the pressure in the pipeline 12 is reduced.

Optionally, the energy storage section 25 automatically releases the energy carried when the pressure in the pipeline 12 is reduced.

A theoretical study was carried out using a mathematical model; as proposed by Oliveira and Negrão ("The effect of compressibility on flow start-up of waxy crude oils"; Journal of Non-Newtonian Fluid Mechanics; Volume 220, June 2015, Pages 137-147), for a computer simulation with the aim of numerically simulating the problem with and without the use of the system with pressure relief tanks as proposed by the present disclosure.

Figure 3:
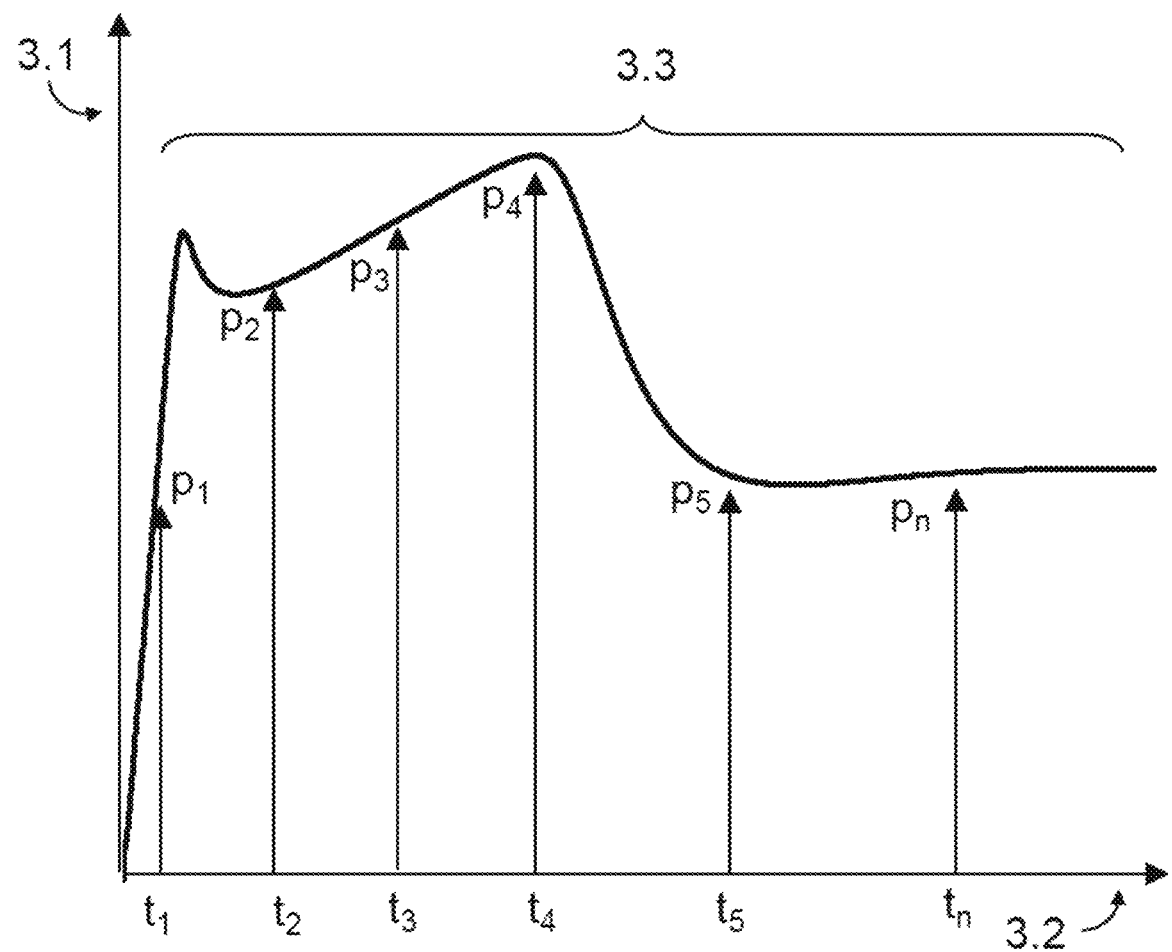
FIG. 3 illustrates the results of a digital simulation of a process for resuming the flow of gelled fluid without the use of the relief tanks of the present disclosure.

Using this simulation, the development of the pressure inside the pipe when the flow of gelled fluid is restarted can be evaluated. To this end, the fluid was considered to be totally gelled (situation arising after a long resting period) inside the whole pipe at the moment prior to the flow being started. Initially, the fluid is pressurised at the entrance of a pipe without pressure relief tanks by means of a constant flow provided by a hydraulic pump. FIG. 3 illustrates the results of the digital simulation for this simulation.

In FIG. 3, axes 3.1 and 3.2 represent, respectively, the pressure at the entrance end of the pipe and the period elapsed after the pressurisation of the fluid is started. The vertical arrows 3.3 represent the pressure values (p1, p2, p3, p4, p5 etc., pn) at the entrance of the pipe at different points in time after pressurisation is started, and the line shows the overall trend. Note that the pressure increases almost linearly until (p1), then the rate of increase is slightly reduced to (p2) owing to the fracturing of the gel near the entrance of the pipe, and the pressure continues to increase almost linearly until (p4), following which it is finally reduced to (pn) after the gel has completely fractured in the pipe.

Figure 4:
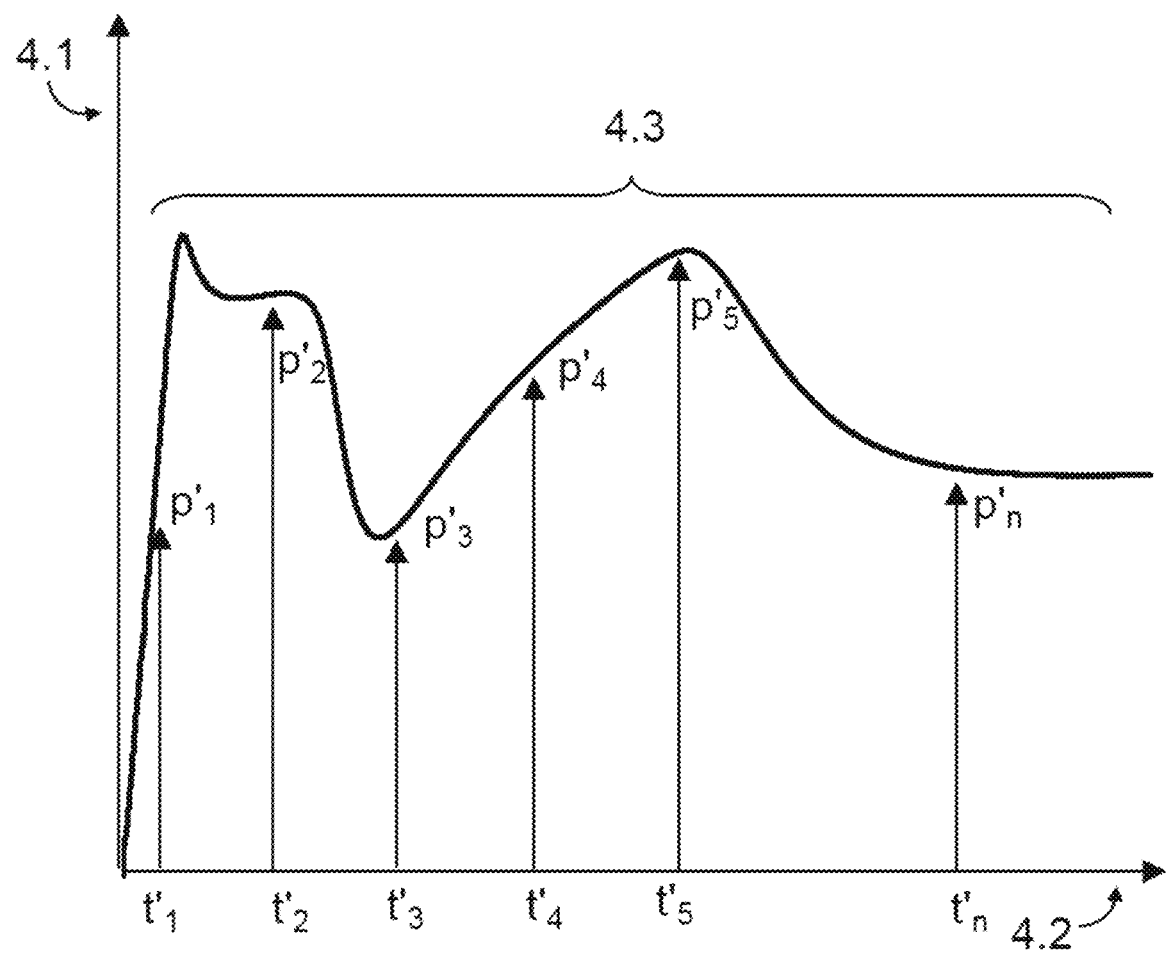
FIG. 4 illustrates the results of a digital simulation of a process for resuming the flow of gelled fluid with the use of the relief tanks of the present disclosure.

A second simulation was then performed in a pipe wherein the system described in this document was applied. For the simulation in question, a single relief tank 13 was placed at the midpoint of the pipe. The conditions of simulation (such as pipe length and pipe diameter values, and the properties of the gelled oil) remained the same as for the first simulation. The pressure graph for the end where the fluid enters the pipe, generated using the same method as used previously, is illustrated in FIG. 4.

Axes 4.1 and 4.2 represent, respectively, the pressure at the entrance end of the pipe and the period elapsed after the pressurisation of the fluid is started. The vertical arrows 4.3 represent the pressure values (p'1, p'2, p'3, p'4, p'5, etc., p'n) at the entrance of the pipe at different points in time after pressurisation is started for the pipe with a pressure relief tank 13.

The simulation for the case using a tank generated a maximum pressure value p'5, when the flow was restarted, which was considerably lower than the maximum pressure obtained for the case without a tank p4 (this can be seen by comparing those peak values to (pn) and (p'n) in each graph, which have the same value due to the same pipe parameters being used in both simulations). This peak pressure reduction at the entrance of the pipe was obtained exclusively by using the relief tank 13, since the other variables were kept the same as for the previous experiment. It should be noted that the results obtained are dependent on the geometric conditions and the properties determined for the gel, and that they therefore only represent a pressure reduction potential for the application of the method in a particular scenario.

In addition, a test bench was set up in order to measure pressures when the flow of gelled fluids was restarted, with and without the use of the system of the present disclosure. To this end, a pipe containing stationary gelled fluid (petroleum) was employed, along with a pressure sensor at the entrance of the pipe; a hydraulic pump; and a pressure relief tank 13, containing a free piston and gas chamber, as described in one of the optional configurations of the disclosure described.

Figure 5:
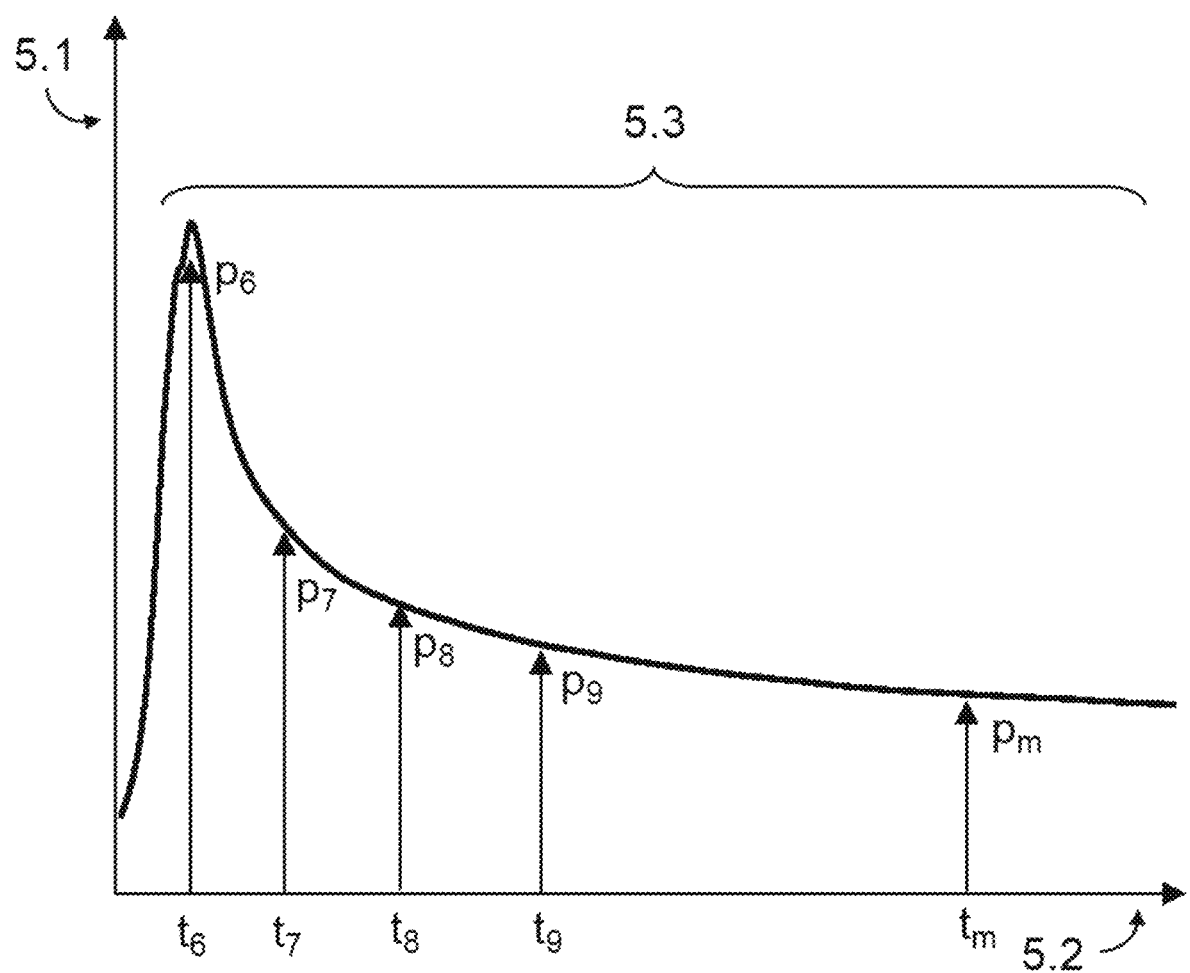
FIG. 5 illustrates the results of an experiment resuming the flow of gelled fluid without the use of the relief tanks of the present disclosure.

FIG. 5 presents the results of restarting flow experimentally, for the case without tanks. Axes 5.1 and 5.2 represent, respectively, the pressure at the entrance end of the pipe and the period elapsed after the pressurisation of the fluid is started. The vertical arrows 5.3 represent the pressure values (p6, p7, p8, p9, etc., pm) at the entrance of the pipe at different points in time after pressurisation is started. Note that the pressure increases almost linearly up to the maximum value (p6) and then decreases continuously up to (pm).

Figure 6:
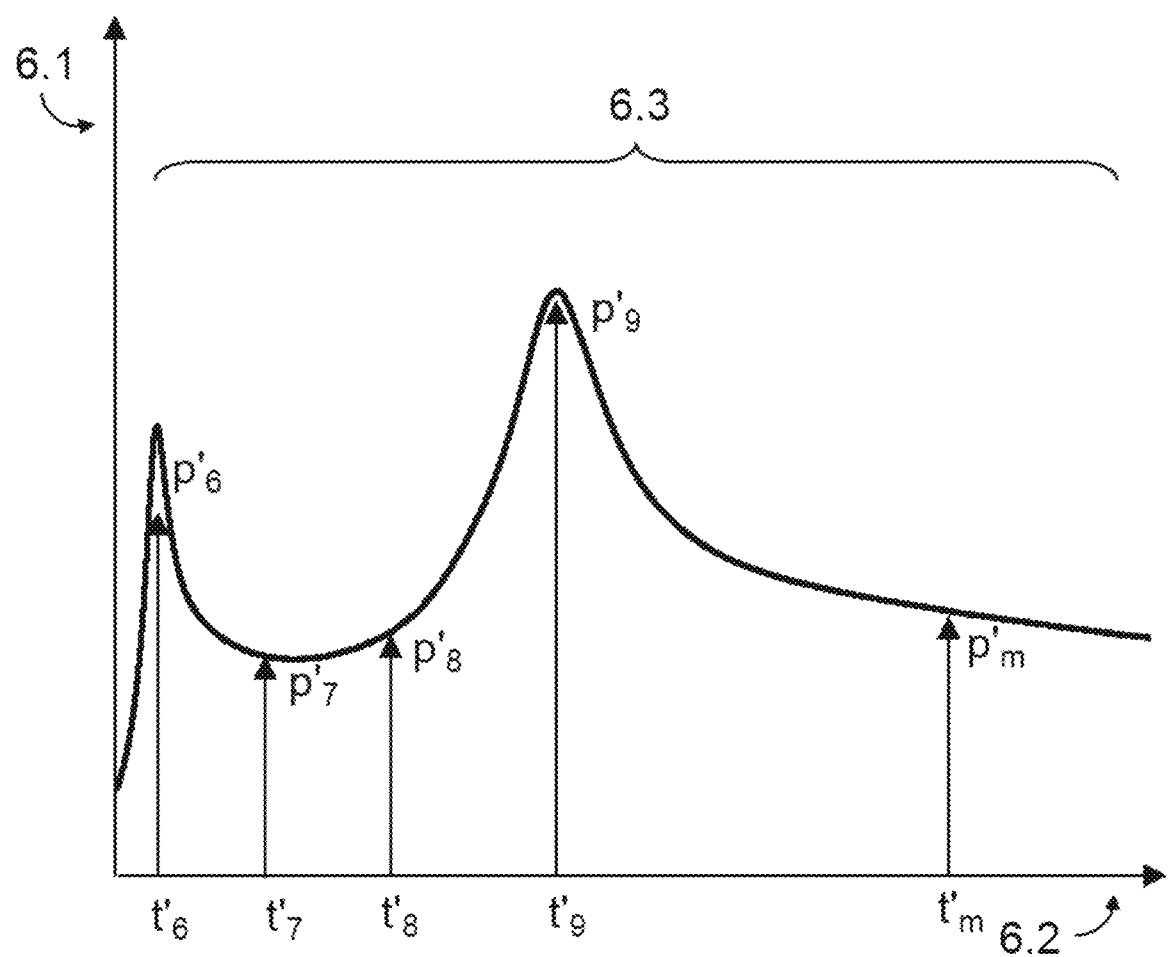
FIG. 6 illustrates the results of an experiment resuming the flow of gelled fluid with the use of the relief tanks of the present disclosure.

FIG. 6, in turn, presents the results of the experimental resumption of flow, for the case with the use of a tank at the midpoint of the pipe. Axes 6.1 and 6.2 represent, respectively, the pressure at the entrance end of the pipe and the period elapsed after the pressurisation of the fluid is started. The vertical arrows 6.3 represent the pressure values (p'6, p'7, p'8, p'9, etc., p'm) at the entrance of the pipe at different points in time after pressurisation is started, A considerable reduction in the maximum pressure at the entrance of the pipe can be observed with a tank (p'9) when compared with the maximum pressure at the entrance of the pipe without a tank (p6) (again, this can be appreciated by comparing the peak values with the value of (pm) and (p'm), which are the same value due to the identical pipes used).

Therefore, in light of the foregoing and the experiments performed, it is clear that the disclosure described herein provides an innovative method and system for solving the problem of starting or restarting flow in pipelines with gelled fluids. Modification of the above-described apparatuses and methods, combinations between different variations as practicable, and variations of aspects of the invention that are obvious to those of skill in the art are intended to be within the spirit and scope of the claims.

What is claimed is:

1. A system for starting or restarting flow of gelled fluid, the system comprising:
   a fuel oil pipeline;
   a relief tank fluidly connected to the fuel oil pipeline, wherein the relief tank is suitable for receiving fluid from the fuel oil pipeline based on starting or restarting the flow of the gelled fluid in the fuel oil pipeline; and
   a pressurising element upstream of the relief tank, suitable for pressurising the fluid in the fuel oil pipeline, and configured to increase pressure exerted when starting or restarting the flow of the gelled fluid in the fuel oil pipeline; and
   a mechanical or electrical system configured to cause the gelled fluid to be expelled from the relief tank when the flow in the fuel oil pipeline has returned to normal.

2. The system according to claim 1, wherein the relief tank comprises a liquid expulsion element for expelling fluid contained in the relief tank into the fuel oil pipeline.

3. The system according to claim 1, wherein the relief tank comprises an energy storage section configured to:
   store energy when the relief tank receives the fluid coming from pipeline and
   subsequently expel fluid contained inside it into the fuel oil pipeline using the stored energy.

4. The system according to claim 1, wherein the relief tank comprises a piston.

5. The system according to claim 4, wherein the piston comprises a separator element configured to separate the relief tank into: a chamber for receiving gelled fluid from the fuel oil pipeline; and a chamber comprising an energy storage section.

6. The system according to claim 3, wherein the energy storage section comprises one or more of: a gas, a fluid, an elastic element, a helical spring, and a foam.

7. The system according to claim 3, wherein the energy storage section is configured to automatically release the stored energy.

8. The system, according to claim 1, comprising a plurality of said relief tanks, distributed along the fuel oil pipeline.

9. A method comprising:
   starting or restarting flow of gelled fluid in a fuel oil pipeline having a relief tank fluidly connected to the fuel oil pipeline and having a pressurising element upstream of the relief tank, the starting or restarting comprising:
      increasing, by the pressurising element, pressure of the gelled fluid in the fuel oil pipeline;
      at least partially filling the relief tank with fluid from the fuel oil pipeline; and
      expelling, by a mechanical or electrical system, the gelled fluid from the relief tank when the flow of the gelled fluid has returned to normal.

10. The method according to claim 9, further comprising expelling fluid contained within the relief tank to the fuel oil pipeline when the pressure in the fuel oil pipeline is reduced.

11. The method according to claim 9, wherein the relief tank comprises an energy storage section, and wherein the method further comprises:
   storing energy in the energy storage section when the relief tank is at least partially filled with the fluid from pipeline and
   expelling the fluid contained inside the energy storage section into the fuel oil pipeline, using the stored energy, when the pressure in the fuel oil pipeline is reduced.

12. The method according to claim 11, further comprising automatically releasing the energy stored in the energy storage section when the pressure in the fuel oil pipeline is reduced.

13. The system according to claim 1, wherein
   the relief tank and the pressurising element are provided at a first section of the fuel oil pipeline, and
   the system further comprises, at a second section of the fuel oil pipeline that is downstream of the first section:
      an additional relief tank fluidly connected to the fuel oil pipeline, wherein the relief tank is suitable for receiving the fluid from the fuel oil pipeline; and
      an additional pressurising element upstream of the additional relief tank, suitable for pressurising the fluid in the fuel oil pipeline.

* * * * *